(12) United States Patent
Beverung et al.

(10) Patent No.: US 8,188,885 B2
(45) Date of Patent: May 29, 2012

(54) WIRELESS DATA PROGRAMMER FOR ELECTRONIC UTILITY REGISTERS AND METERS

(75) Inventors: Ryan M. Beverung, Glendale, WI (US); Brian E. Brandt, West Bend, WI (US)

(73) Assignee: Badger Meter, Inc., Milwaukee, WI (US)

( * ) Notice: Subject to any disclaimer, the term of this patent is extended or adjusted under 35 U.S.C. 154(b) by 916 days.

(21) Appl. No.: 12/235,092

(22) Filed: Sep. 22, 2008

(65) Prior Publication Data
US 2010/0073191 A1  Mar. 25, 2010

(51) Int. Cl.
*B08B 23/00* (2006.01)
(52) U.S. Cl. .................................. 340/870.02
(58) Field of Classification Search .............. 340/870.02
See application file for complete search history.

(56) References Cited

U.S. PATENT DOCUMENTS

| | | | |
|---|---|---|---|
| 5,495,167 A * | 2/1996 | Cotroneo | ........................ 324/74 |
| 5,974,312 A | 10/1999 | Hayes et al. | |
| 6,611,769 B2 | 8/2003 | Olson | |
| 6,700,479 B2 | 3/2004 | Birchfield | |
| 7,042,368 B2 | 5/2006 | Patterson et al. | |
| 7,123,937 B2 | 10/2006 | Kuo | |
| 2001/0054005 A1 | 12/2001 | Hook et al. | |
| 2003/0174242 A1 | 9/2003 | Carmi et al. | |
| 2003/0201675 A1 | 10/2003 | Alexanian et al. | |
| 2006/0158347 A1 | 7/2006 | Roche et al. | |
| 2007/0067072 A1 | 3/2007 | Chopcinski et al. | |
| 2008/0266133 A1 * | 10/2008 | Martin | ..................... 340/870.02 |

\* cited by examiner

*Primary Examiner* — Robert Deberadinis
(74) *Attorney, Agent, or Firm* — Boyle Fredrickson, S.C.

(57) ABSTRACT

A handheld, key-operated programmer device (10) for transferring data to and from an electronic meter register. Communication between the device (10) and the electronic register takes place over a wireless optical interface (20). The device (10) is configured through a USB port (14) using a personal computer. Operations between the device (10) and the meter register include cycling the meter register display, clearing a totalizer, resetting alarm conditions, and retrieving stored configuration data. A swipe with a magnet is no longer necessary to cycle through the display. The device is battery-powered and can be embodied in a key fob.

9 Claims, 4 Drawing Sheets

WIRELESS DATA PROGRAMMER FOR ELECTRONIC UTILITY REGISTERS AND METERS

TECHNICAL FIELD

This invention relates to utility meters, for measuring usage of a fluid, such as water or gas, and more particularly it relates to a wireless programmer unit for controlling functions and transfer of data to and from a meter register or an electronic meter and register assembly.

DESCRIPTION OF THE BACKGROUND ART

Utility meters for water or gas have for many years used a flow metering element, such as a turbine, paddle wheel or nutating disc, or other element which is disposed in a housing connected in a pipeline.

The utility meter assembly has been completed by a meter register, which has had a mechanical gear arrangement driving an odometer-style set of number wheels disposed under a glass or crystal for visual observation of accumulated flow totals by a meter reading technician.

In recent years, remote read-out devices have been provided to relay the accumulated totals to the outside of a residence or building for easier access by a meter reading technician. Radio systems have also been introduced in which the quantities of consumption are signaled by RF signals from the meter to a data collection vehicle or to a fixed RF receiving station.

Olson et al., U.S. Pat. No. 6,611,769, discloses an electronic meter register for a water meter in which the mechanical gear arrangement has been replace by electronic circuitry.

Lazar et al., U.S. Pat. Pub. No. US2007/0186644, discloses an electronic meter register for a fluid meter converting mechanical-to-electrical transducer signals to radio signals for transmission to an external device as the primary mode of reporting utility consumption.

In view of the development of electronic meter registers with transmitters, transceivers and other electronic functions, it is desired to provide a quick and easy way of installing and configuring the meter registers in the field.

An existing method to configure an electronic register uses an interface box that creates a wired serial connection between the electronic register and a laptop computer. This method requires that the computer have a DB9 serial port available. Many new laptop computers are no longer manufactured with a DB9 serial port. The nature of this method requires that a computer be present and connected to the electronic register transmitter through the interface box.

As disclosed in Olson et al., U.S. Pat. No. 6,611,769, an existing method to cause the display screen to cycle on an electronic register requires a swipe by the register with a strong external magnet. The magnet swipe can only be used to cycle the display and not to change the functions of the device.

SUMMARY OF THE INVENTION

The invention provides a programmer device for transferring data to and from a utility meter register, the device comprising a first data port for wireless transfer of configuration data to the meter register and wireless transfer of status data from the meter register; a second data port for transfer of configuration data a personal computer and status data to the personal computer; at least one microcontroller for controlling transfer of data through the first port and the second data port; and in which the device can be held in a palm of one hand of a user.

In a further aspect of the invention, the programmer device has a key labeled "display" for actuating the signaling of the meter register through the first data port to cycle through a plurality displays on the meter register as the key is repeatedly actuated.

In a further aspect of the invention, the programmer device also has a key labeled "program" for actuating the signaling of the meter register through the first data port to transfer configuration data to the meter register.

In a further aspect of the invention, the programmer device has a key labeled "read" for actuating the signaling of the meter register through the first data port to read status data from the meter register.

In a further aspect of the invention, the device runs solely on battery power.

In one specific embodiment of the invention, the programmer device is embodied in a key fob.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE PREFERRED EMBODIMENT

Figure 1:
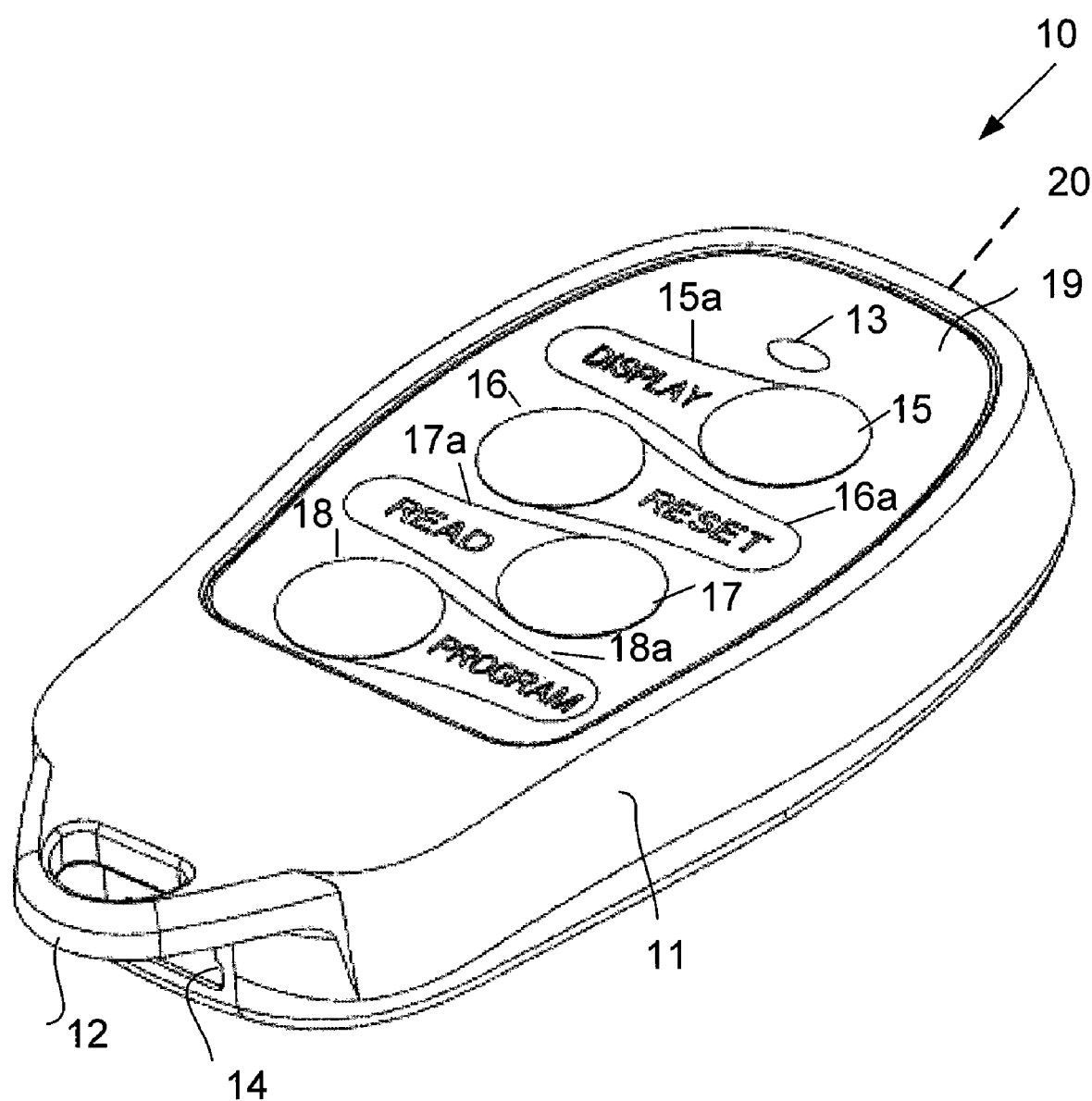
FIG. 1 is a perspective view of a programmer device of the present invention.

FIG. 1 illustrates a preferred embodiment of a handheld programmer device 10 that is used to transfer data to and from an electronic meter register of a type disclosed in Olson et al. U.S. Pat. No. 6,611,769, FIGS. 1 and 2A. The device 10 has a housing 11 with an integrally formed loop 12 for receiving a key chain or a lace, string or cord for carrying the device 10. The device 10 is about the size of a computer mouse, but could be larger or smaller in other embodiments. As shown in FIG. 1, the device 10 is embodied in a key fob.

Communication between the device 10 and the electronic register takes place over a wireless optical (infrared-raw IrDA) interface 20 that implements the IrPHY layer of the IrDA stack. The optical interface 20 could be located at the end of the housing 11 facing away from the user, as represented in FIG. 1. The enclosure 11 is molded from a translucent polycarbonate with IR-transmissive colorant that allows infrared light to pass through it. Keys 15, 16, 17 and 18 are provided on the face 19 of the handheld device 10 to allow for user inputs. Next to the keys 15, 16, 17 and 18 are labels 15a, 16a, 17a and 18a describing the functions of the keys. A red/green LED 13 on the top face of the device 10 provides visual feedback to the user from actuations of the keys 15, 16, 17 and 18 and communication through the optical interface 20.

Operations between the device 10 and the meter register include cycling the meter register display, clearing a totalizer in the meter register, resetting alarm conditions in the meter register, and retrieving stored configuration data from the meter register. For an illustration of a meter register display, and a description of these functions, reference is made to Olson et al., U.S. Pat. No. 6,611,769, FIG. 7-14 and col. 6, line 31 to col. 8, line 6. The device 10 of the present invention will cycle the meter register display (not shown) with the actuation of a "DISPLAY" key 15. A swipe of a magnet past the meter register will no longer be necessary. In addition, the device 10 allows for more flexibility for added commands such as clearing a totalizer, resetting alarm conditions, and retrieving stored configuration data.

Figure 2:
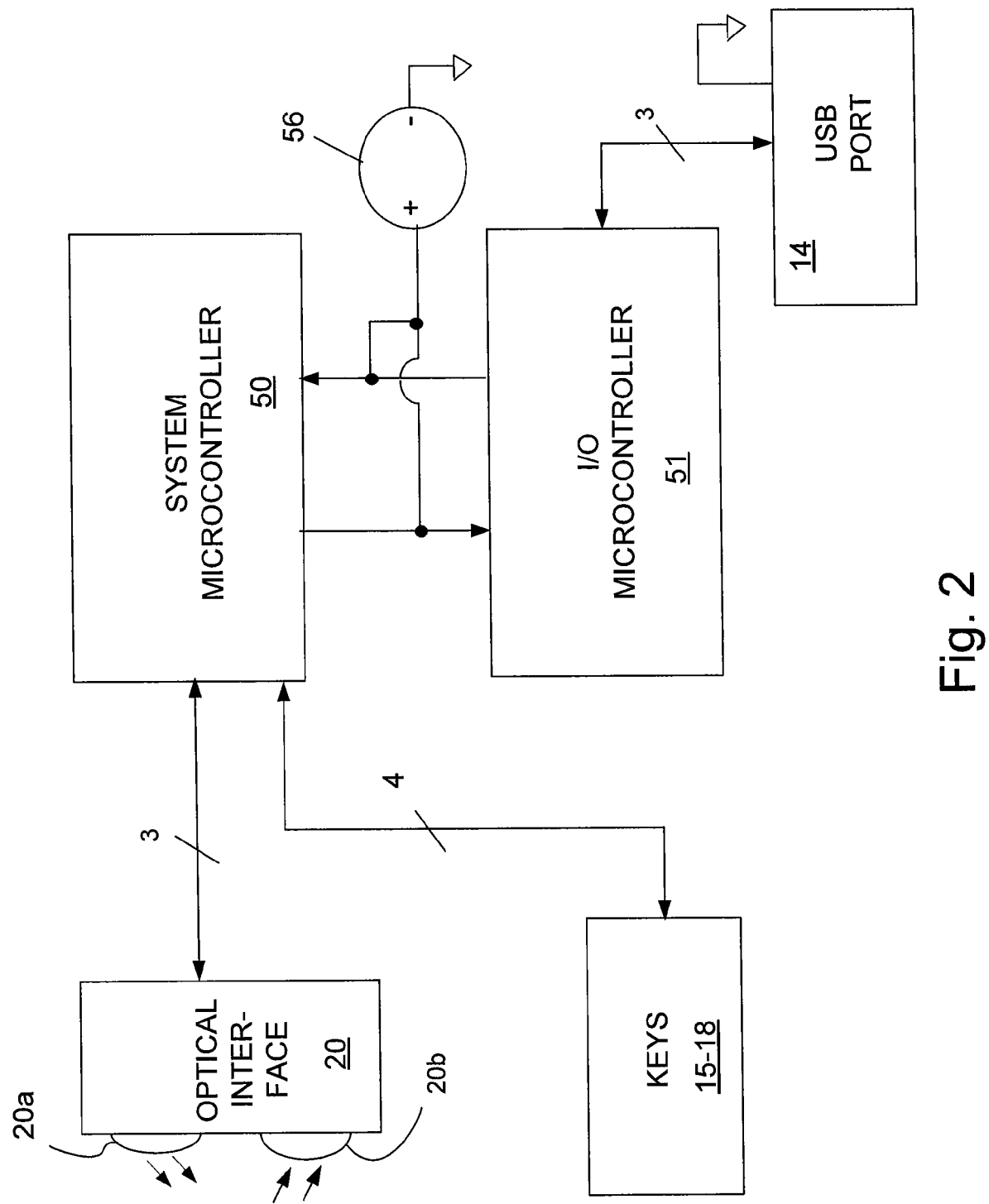
FIG. 2 is a block diagram of the circuitry of the programmer device of FIG. 1.

In preparation for the operations just mentioned, the device 10 is programmed by a personal computer of a conventional type via a USB (universal serial bus) port 14 (FIGS. 1 and 2). USB is a standard for peripheral communication used by most personal computers commercially offered at time of this invention. A DB9 serial port on the computer is, therefore, no longer necessary. After configuration parameters are transferred into the programmer device 10, the device 10 can be disconnected from the computer, transported in the field and used to configure an electronic register without the presence of a computer. The small size of the device 10 makes it easier to transport than a computer. Configuration data is transferred to the electronic meter register via the infrared wireless signals. A wired connection is not necessary.

The USB interface 14 allows the programmer device 10 to be programmed from a personal computer. The computer will send, to the optical device, a 64-byte data packet that contains the configuration parameters for the electronic register. The programmer device 10 will store the 64-byte data packet internally in flash memory, which is reprogrammable and nonvolatile. The device 10 can then be unplugged from the USB connection and transported to the location of the electronic register to perform configuration.

Actuation of one of the keys 15, 16, 17 and 18 on the handheld device 10 indicates which command to transmit via the infrared interface 13. The optical device 10 is the initiator of IR (infrared) wireless communication. An infrared transmission attempt will be preceded by a 240-byte wakeup header that establishes the wireless link with the electronic register. The electronic register will respond with an acknowledgement of a successful wireless link. The optical device 10, after reception of the acknowledgement, will send a command or a 64-byte configuration packet to the electronic register. All commands and data packets will include CRC termination bytes to verify that the received message is valid. Communication will be complete within one second of initial key actuation.

FIG. 2 is a block diagram of the circuitry inside the housing 11. This circuitry is mounted on a circuit board. It includes an overall system microcontroller 51, which in this example, is preferably a MSP430 commercially available from Texas Instruments. This circuit includes a microelectronic CPU, on-board memory and certain I/O circuits for interfacing through serial I/O buses to external circuits and devices. This microcontroller 51 is connected through three lines for bidirectional transfer of serial data to the data port 13. This data port 13 operates according to the raw IrDA standard for wireless communication and has two optical elements 20a, 20b for transmitting and receiving signals in the infrared, non-visible, frequency range. The microcontroller 51 is also connected through four lines to receive inputs from the keys 15, 16, 17 and 18. The optical port microcontroller 50 is also connected through two lines for bidirectional serial data transfer to an I/O (input/output) interface microcontroller 51, which in this example is preferably a CP2102 microcontroller commercially available from Silicon Labs. This is described by the manufacturer as a single chip USB transceiver to UART bridge. This I/O microcontroller 51 connects through three lines to the USB port 14 for transmitting and receiving signals internally and externally on a USB bus. The circuitry of the device 10 is powered by a single replaceable CR2032 lithium cell camera battery 56.

Figure 3:
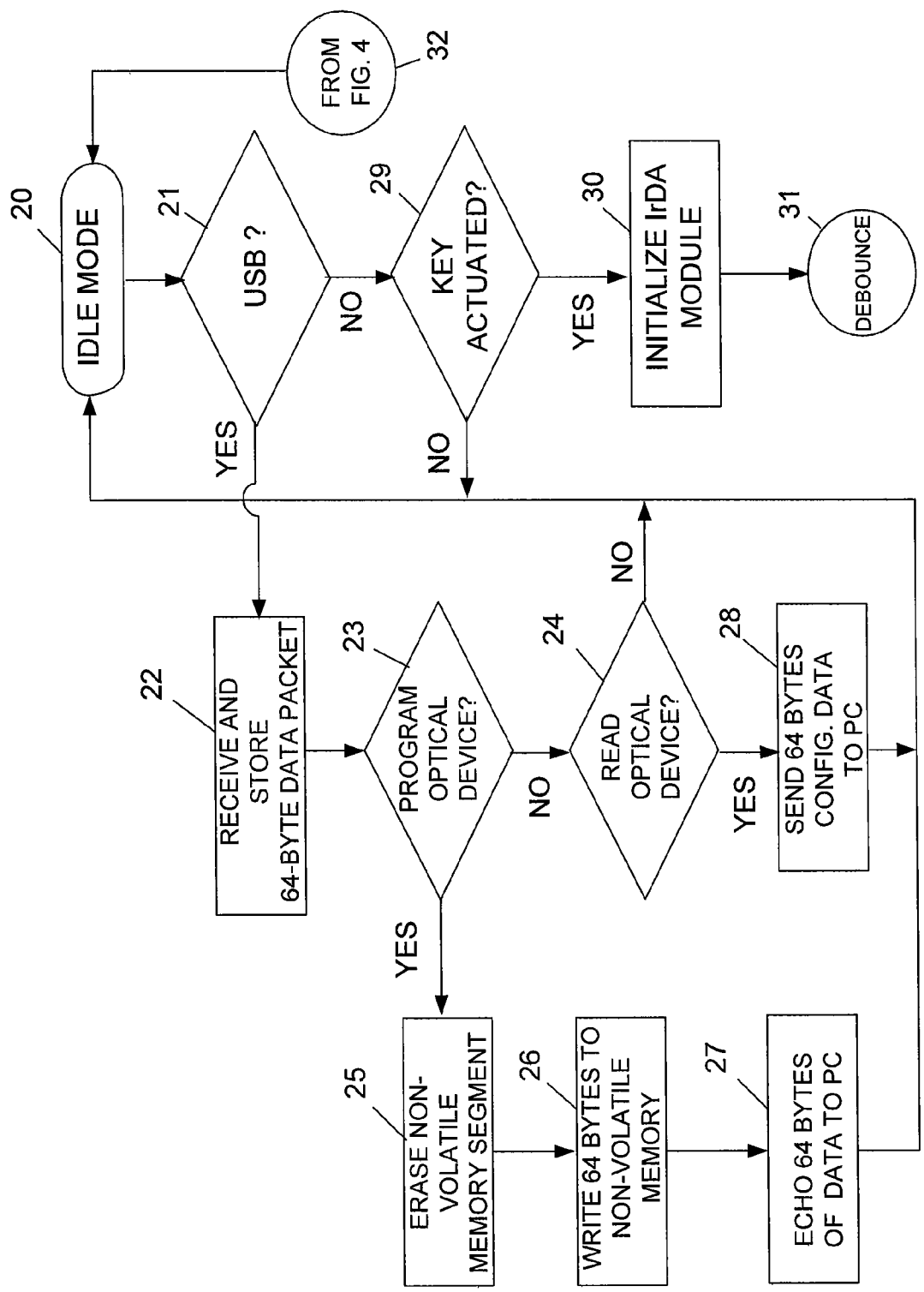
FIGS. 3 and 4 are parts of a flow chart of a program routine for operation of the programmer device of FIG. 1.
Figure 4:
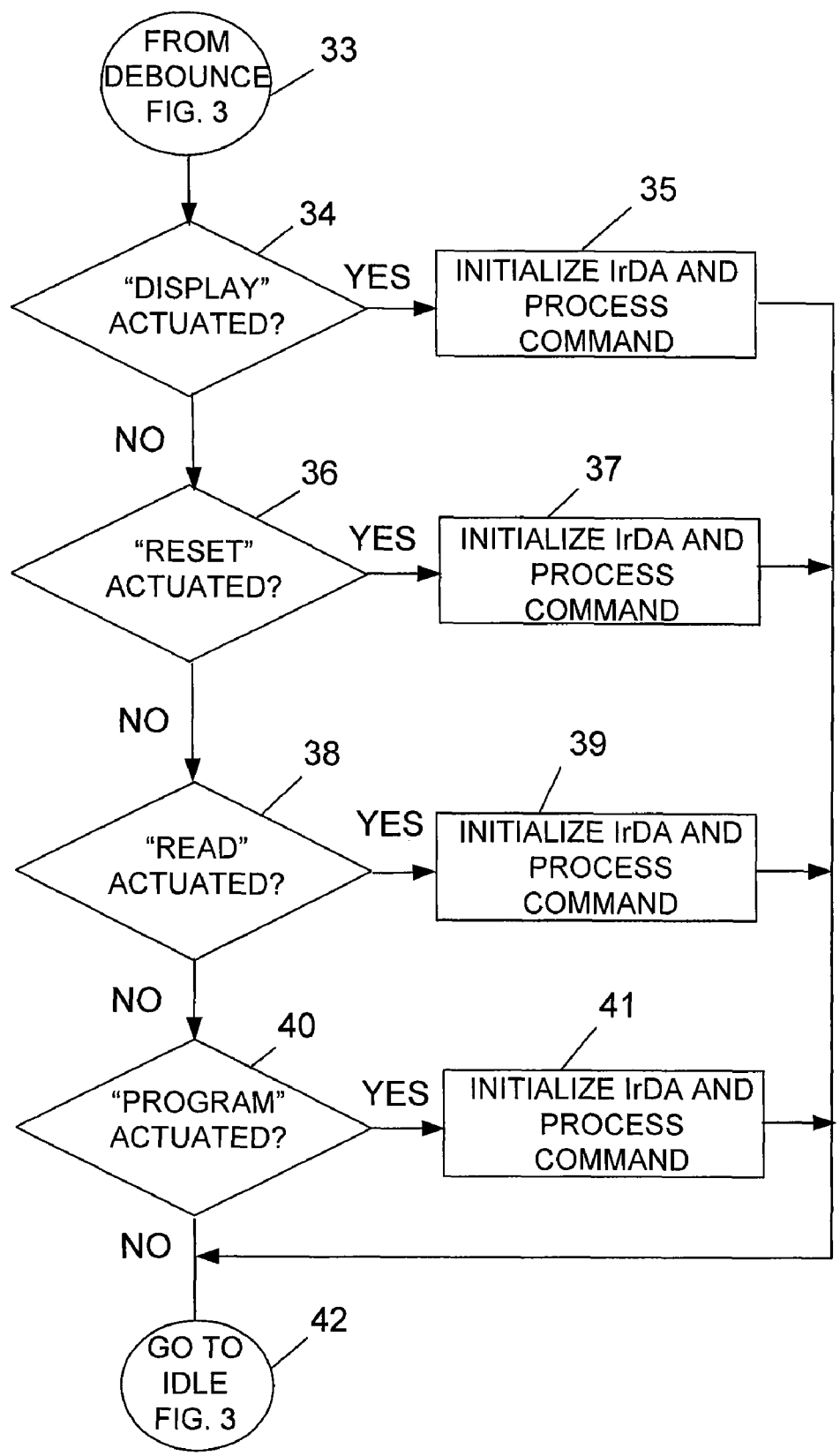

The device 10 operates under the control of a stored computer program including an interrupt-driven control loop routine or sequence as represented by FIGS. 3 and 4. The blocks in the illustrations in FIGS. 3 and 4 represent one or more program instructions in the computer program that are stored on board and executed by the system microcontroller 50.

As seen in FIG. 3, after a power up routine (not shown), the device 10 will enter an idle mode, represented by an initialization block 20. In the first part of the control loop routine, a check is made for a signal from the I/O controller 51 that data from the USB port 14 is ready for processing. If so, as represented by the "YES" branch from decision block 21, a 64-byte packet of data is received as represented by process block 22. A check is then made, as represented by decision block 23 as to whether the data is configuration data for programming the handheld device 10 for later communicating with the meter register. If the answer is "YES," the program proceeds to process block 24 to erase the current configuration in the non-volatile memory as represented by process block 25. The new data is then written into non-volatile memory as represented by process block 26. This data is then echoed back to the personal computer on the other end of the USB connection to confirm the new configuration, as represented by process block 27. The program returns to the idle mode represented by block 20. If the result from executing decision block 23 is "NO," then a check is made as represented by decision block 24 to see if data is to be read from the device 10. If the result is "YES," the routine proceeds to transfer sixty-four (64) bytes of data back to the personal computer on the other end of the USB connection, as represented by process block 28. If the result is "NO," from executing block 24, the program returns to the idle mode represented by block 20.

Returning to decision block 21, if no data is present for transfer through the USB port, a check is made for inputs from the keyboard, as represented by the decision block 29, with the caption "Key Actuated?" If the answer is "NO," the program will cycle back to the idle mode. If a key is detected, the IrDA port is initialized, as represented by process block 30 and the routine proceeds to a debounce portion seen in FIG. 4, as represented by connector 31.

Referring next to FIG. 4, after entering the sequence at connector 33, a check is made for the "Display" key being pressed. If the result is a "YES," the program branches to a block 35 to process the key. In processing the key input, there will be a further initialization of the IrDA interface, a header will be sent to the IrDA interface to followed by a command to the meter register, which in this case will be a "Display" command. After communicating the command in response to the key input, the routine will return to the idle mode 20.

If the result of testing for the "Display" key is negative, as represented by the "NO" result from decision block 34, then a check is made for the "Reset" key, as represented by decision block 36. If the result is a "YES," the program branches to a block 37 to process the key. For actuating the key, there will be a further initialization of the IrDA interface, a header will be sent to the IrDA interface to followed by a command to the meter register, which in this case will be a "Reset" command. (Here describe the functions carried out by the Reset Command.) After communicating the command in response to the key input, the routine will return to the idle mode 20.

If the result of testing for actuation of the "Reset" key is negative, as represented by the "NO" result from decision block 36, then a check is made for the "Read" key, as represented by decision block 38. If the result is a "YES," the program branches to a block 39 to process the key. In processing the key input, there will be a further initialization of the IrDA interface, a header will be sent to the IrDA interface to followed by a command to the meter register, which in this case will be a "Read" command. The device 10 will then read in sixty-four (64) byte block of data from the meter register and store it. It will then echo the data to meter register as part of the IrDA protocol. After communicating the command in response to the key input, the routine will return to the idle mode 20.

If the result of testing for the "Read" key is negative, as represented by the "NO" result from decision block 38, then a check is made for the "Program" key, as represented by decision block 40. If the result is a "YES," the program branches to a block 41 to process the key. In processing the key input, there will be a further initialization of the IrDA interface, a header will be sent to the IrDA interface to followed by a command to the meter register, which in this case will be a "Program" command. The device 10 will then transmit a sixty-four (64) byte block of configuration data to the meter register and will receive an echo of that data from the meter register according to the IrDA protocol. After communicating the command in response to the key input, the routine will return to the idle mode 20.

From this description, it can be seen how the programmer device 10 communicates with the personal computer and also with the meter register in response to key inputs.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. A programmer device for transferring data to and from a utility meter register, the comprising:

a first data port for wireless transfer of configuration data to the meter register and wireless transfer of status data from the meter register;

a second data port for transfer of configuration data from a personal computer and status data to the personal computer;

at least one microcontroller for controlling transfer of data through the first data port and through the second data port; and wherein the device includes four keys for controlling the operation of the device and can be held in a palm of one hand of a user and operated using a thumb of the same hand.

2. The programmer device of claim 1, wherein programmer device can signal a meter register through the first data port to cycle through various displays on the meter register.

3. The programmer device of claim 2, wherein the programmer device has a key labeled "display" for actuating signaling of the meter register through the first data port to cycle through a plurality displays on the meter register.

4. The programmer device of claim 3, wherein the programmer device has a key labeled "program" for actuating signaling of the meter register through the first data port to transfer configuration data to the meter register.

5. The programmer device of claim 4, wherein the programmer device has a key labeled "read" for actuating the signaling of the meter register through the first data port to read status data from the meter register.

6. The programmer device of claim 1 or claim 3, wherein the first data port communicates according to an IrDA standard for wireless communication.

7. The programmer device of claim 1 or claim 3, wherein the second port communicates through a universal serial bus (USB).

8. The programmer device of claim 1 or claim 3, wherein the device is powered solely by a battery.

9. The programmer device of claim 1 or claim 3, wherein programmer device is embodied in a key fob.

* * * * *